United States Patent
Starner et al.

(10) Patent No.: US 8,982,471 B1
(45) Date of Patent: Mar. 17, 2015

(54) HMD IMAGE SOURCE AS DUAL-PURPOSE PROJECTOR/NEAR-EYE DISPLAY

(75) Inventors: Thad Eugene Starner, Mountain View, CA (US); Chia-Jean Wang, Palo Alto, CA (US)

(73) Assignee: Google Inc., Mountain View, CA (US)

(*) Notice: Subject to any disclaimer, the term of this patent is extended or adjusted under 35 U.S.C. 154(b) by 101 days.

(21) Appl. No.: 13/447,743

(22) Filed: Apr. 16, 2012

Related U.S. Application Data

(60) Provisional application No. 61/582,889, filed on Jan. 4, 2012.

(51) Int. Cl.
    *G03H 1/00* (2006.01)
    *G02B 27/14* (2006.01)

(52) U.S. Cl.
    USPC .......................................... 359/630; 359/13

(58) Field of Classification Search
    USPC ............ 359/627–630, 632, 639, 13; 345/4, 5, 345/7–9; 348/47–52, 115, E13.036
    See application file for complete search history.

(56) References Cited

U.S. PATENT DOCUMENTS

| 5,606,458 | A | * | 2/1997 | Fergason | 359/630 |
|---|---|---|---|---|---|
| 6,312,129 | B1 | * | 11/2001 | Sisodia et al. | 353/31 |
| 2004/0164927 | A1 | * | 8/2004 | Suyama et al. | 345/32 |
| 2006/0279662 | A1 | * | 12/2006 | Kapellner et al. | 348/744 |
| 2010/0247037 | A1 | * | 9/2010 | Little | 385/28 |
| 2010/0277803 | A1 | * | 11/2010 | Pockett et al. | 359/567 |

FOREIGN PATENT DOCUMENTS

JP           201177851        6/2011

* cited by examiner

*Primary Examiner* — Joseph P Martinez
*Assistant Examiner* — Brandi Thomas
(74) *Attorney, Agent, or Firm* — McDonnell Boehnen Hulbert & Berghoff LLP

(57) ABSTRACT

A wearable computing system may include a head-mounted display (HMD) and an optical system with a display panel configured to generate images. The optical system may include an optical element that is adjustable between at least a first configuration and a second configuration. When the optical element is in the first configuration, the images generated by the display panel are viewable at an internal viewing location. When the optical element is in the second configuration, the images generated by the display panel are projected externally from the HMD. For example, the location, refractive index, reflectance, opacity, and/or polarization of the optical element could be adjusted.

32 Claims, 7 Drawing Sheets

US 8,982,471 B1

HMD IMAGE SOURCE AS DUAL-PURPOSE PROJECTOR/NEAR-EYE DISPLAY

CROSS-REFERENCE TO RELATED APPLICATIONS

This application claims priority to U.S. Provisional Patent Application Ser. No. 61/582,889 filed Jan. 4, 2012, the contents of which are hereby incorporated by reference.

BACKGROUND

Wearable systems can integrate various elements, such as miniaturized computers, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems and miniaturized optical elements, it has become possible to consider wearable compact optical displays that augment the wearer's experience of the real world.

By placing an image display element close to the wearer's eye(s), an artificial image can be made to overlay the wearer's view of the real world. Such image display elements are incorporated into systems also referred to as "near-eye displays", "head-mounted displays" (HMDs) or "heads-up displays" (HUDs). Depending upon the size of the display element and the distance to the wearer's eye, the artificial image may fill or nearly fill the wearer's field of view.

SUMMARY

In a first aspect, a wearable computing system is provided. The wearable computing device includes a head-mounted display (HMD) having an internal side and an external side. The HMD includes a display panel configured to generate images. The wearable computing device further includes an optical element. The optical element is optically coupled to the display panel and is adjustable between a first configuration and a second configuration. The images generated by the display panel are viewable at an internal viewing location when the optical element is in the first configuration and the images generated by the display panel are projected externally from the HMD when the optical element is in the second configuration. A field of view of a real-world environment is viewable from the internal viewing location when the optical element is in the first configuration and when the optical element is in the second configuration. The wearable computing device also includes a computer. The computer is configured to adjust the optical element between the first configuration and the second configuration.

In a second aspect, a method is provided. The method includes generating images using a display panel of a head-mounted display (HMD). The display panel is optically coupled to an optical element. The HMD has an internal side and an external side. The method further includes selecting a configuration of the optical element from among at least a first configuration and a second configuration. The images generated by the display panel are viewable at an internal viewing location when the optical element is in the first configuration. The images generated by the display panel are projected externally from the HMD when the optical element is in the second configuration. A field of view of a real-world environment is viewable from the internal viewing location when the optical element is in the first configuration and when the optical element is in the second configuration. The method also includes controlling the optical element to be in the selected configuration.

In a third aspect, a non-transitory computer readable medium is provided. The non-transitory computer readable medium includes instructions executable by a computing device to cause the computing device to perform functions, the functions including controlling a display panel of a head-mounted display (HMD) to generate images. The display panel is optically coupled to the optical element. The HMD has an internal side and an external side. The functions further include selecting a configuration of the optical element from among at least a first configuration and a second configuration. The images generated by the display panel are viewable at an internal viewing location when the optical element is in the first configuration. The images generated by the display panel are projected externally from the HMD when the optical element is in the second configuration. A field of view of a real-world environment is viewable from the internal viewing location when the optical element is in the first configuration and when the optical element is in the second configuration. The functions further include controlling the optical element to be in the selected configuration.

DETAILED DESCRIPTION

Figure 1:
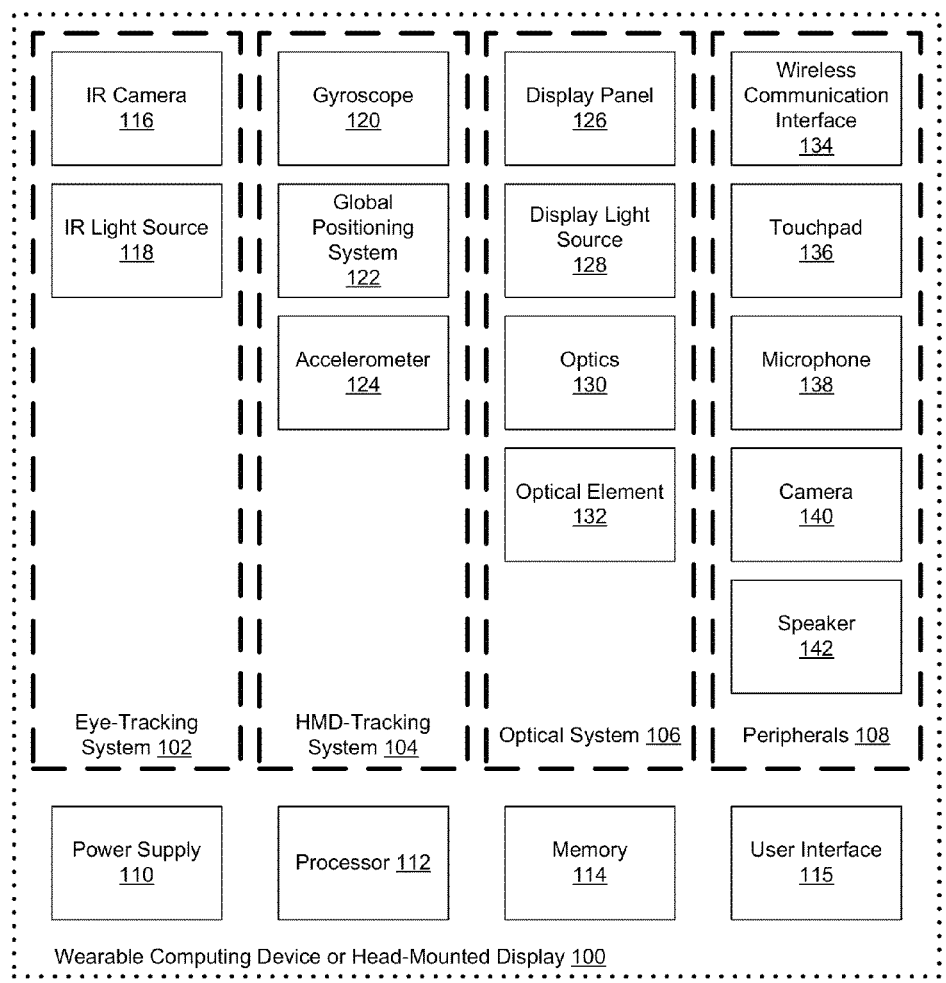
FIG. 1 is a schematic diagram of a wearable computing device, in accordance with an example embodiment.

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

A head-mounted display ("HMD") may enable its wearer to observe the wearer's real-world surroundings and also view a displayed image, such as a computer-generated image or virtual image. In some cases, the displayed image may overlay a portion of the wearer's field of view of the real world. Thus, while the wearer of the HMD is going about his or her daily activities, such as walking, conversing, exercising, etc., the wearer may be able to see a displayed image generated by the HMD at the same time that the wearer is looking out at his or her real-world surroundings.

The displayed image might include, for example, graphics, text, and/or video. The content of the displayed image could relate to any number of contexts, including but not limited to the wearer's current environment, an activity in which the wearer is currently engaged, the biometric status of the wearer, and any audio, video, or textual communications that have been directed to the wearer. The images displayed by the HMD may also be part of an interactive user interface. For example, the HMD could be part of a wearable computing device. Thus, the images displayed by the HMD could include menus, selection boxes, navigation icons, or other user interface features that enable the wearer to invoke functions of the wearable computing device or otherwise interact with the wearable computing device.

The images displayed by the HMD could appear anywhere in the wearer's field of view. For example, the displayed image might occur at or near the center of the wearer's field of view, or the displayed image might be confined to the top, bottom, or a corner of the wearer's field of view. Alternatively, the displayed image might be at the periphery of or entirely outside of the wearer's normal field of view. For example, the displayed image might be positioned such that it is not visible when the wearer looks straight ahead but is visible when the wearer looks in a specific direction, such as up, down, or to one side. In addition, the displayed image might overlay only a small portion of the wearer's field of view, or the displayed image might fill most or all of the wearer's field of view. The displayed image could be displayed continuously or only at certain times (e.g., only when the wearer is engaged in certain activities).

The images displayed by the HMD could also be projected externally from the HMD. For instance, an optical element of the HMD could be adjusted such that images could be partially or entirely projected externally from the HMD. Additionally, images could be controllably viewable at an internal viewing location, which may correspond to one or more eyes of the HMD wearer. In some embodiments, the images could be externally projected out an aperture located on the front of the HMD, for instance to create a virtual workspace in front of a wearer of the HMD. Depending upon the embodiment, images could also be projected elsewhere. The externally projected images could be identical to those viewable at the internal viewing location. Alternatively, the externally projected images could be different from those images viewable at the internal viewing location.

The externally projected images could be viewable when projected on a surface such as a wall or a desk. Furthermore, the externally projected images could represent a virtual control panel with which the HMD wearer and/or others could interact. For instance, the externally projected images could represent a virtual workspace with various objects that could be manipulated by, for instance, voice, gesture, or touch interactions. The externally projected images could appear to float in space or could appear fixed in relation to a real world object, surface, or other reference point.

As mentioned above, an optical element of the HMD could be adjusted to provide the externally projected images and/or the images viewable at the internal viewing location. The optical element could include one or more optical components, which may include mirrors, beam splitters, wave plates, lenses, and other optical components and combinations known in the art. The optical element could include, for instance, a polarizing beam splitter that may selectively transmit or reflect light depending on, for instance, its polarization. Thus, in some embodiments of this invention, one light polarization could be externally projected while a second light polarization could be viewable at an internal viewing location (e.g., the HMD wearer's eye). Further, an example embodiment could include a polarizing beam splitter optically coupled to a switchable wave plate, which may be configured to change the angle of polarization in response to, for instance, an electric signal. Thus, the proportion of externally projected light with respect to the light viewable at the internal viewing location could be adjusted by changing the polarization angle of the switchable wave plate. The HMD could control the switchable wave plate and the adjusting of the polarization angle could occur in a dynamic or a static fashion.

In another example, the optical element could include a moveable mirror that moves mechanically, for example, to permit images to be externally projected from the HMD. More generally, the optical element could be configured to have a first configuration and a second configuration. Further, the difference between the first and the second configurations could represent a difference in one or more properties of the optical element. The configuration of the optical element could be adjusted between the first and the second configuration such that images generated by a display panel could be externally projected from the HMD and/or viewable at an internal viewing location.

In still another example embodiment, the optical element could include a mirror with an adjustable reflectance. For instance, the mirror could include a liquid crystal material that may change reflectance based on an electrical signal input. In the first configuration, the optical element could be substantially reflective. In this configuration, the images generated by the display panel could be reflected from the optical element towards a proximal beam splitter, image former, and then towards the internal viewing location (e.g., the HMD wearer's eye). In the second configuration, the optical element could be substantially transparent. In this configuration, images generated by the display panel could be substantially transmitted through the optical element. The images may then be modified (e.g., using focus, zoom, and keystone adjustments) by projection optics. The images could then be projected externally from the HMD. One such switchable mirror is commercially-available as the e-TransFlector product from Kent Optronics, Hopewell Junction, N.Y.

In other embodiments, the difference between the first and the second configurations of the optical element could include a difference in the refractive index and/or the opacity of the optical element. These differences could be used to direct the images generated by the display panel towards the internal viewing location and/or towards the projection optics for external projection. Those skilled in the art will understand that there are multiple ways to block and/or redirect light beams in an optical system. Each of these techniques is implicitly considered herein within the context of controlling an optical element to provide a dual-purpose projector/near-eye display.

The images viewable at the internal viewing location could be virtual images that cannot be projected. Therefore, the display panel could be configured to additionally or alternatively produce real images that could be projected externally. The real (externally projected) images and virtual (viewable to the HMD wearer at an internal viewing location) images could be substantially similar or could differ materially. In addition, a mixture of real and virtual images may be used in the HMD. Further, it is understood that various methods exist to manipulate both real and virtual images, each method of which is contemplated herein.

2. A Head-Mounted Display with Dual-Purpose Projector/Near-Eye Display

FIG. 1 is a schematic diagram of a wearable computing device or a head-mounted display (HMD) 100 that may include several different components and subsystems. As shown, the HMD 100 includes an eye-tracking system 102, an HMD-tracking system 104, an optical system 106, peripherals 108, a power supply 110, a processor 112, a memory 114, and a user interface 115. The eye-tracking system 102 may include hardware such as an infrared camera 116 and at least one infrared light source 118. The HMD-tracking system 104 may include a gyroscope 120, a global positioning system (GPS) 122, and an accelerometer 124. The optical system 106 may include, in one embodiment, a display panel 126, a display light source 128, and optics 130. The peripherals 108 may include a wireless communication interface 134, a touchpad 136, a microphone 138, a camera 140, and a speaker 142.

In an example embodiment, HMD 100 includes a see-through display. Thus, the wearer of HMD 100 may observe a portion of the real-world environment, i.e., in a particular field of view provided by the optical system 106. In the example embodiment, HMD 100 is operable to display virtual images that are superimposed on the field of view, for example, to provide an "augmented reality" experience. Some of the virtual images displayed by HMD 100 may be superimposed over particular objects in the field of view. HMD 100 may also display images that appear to hover within the field of view instead of being associated with particular objects in the field of view.

Components of the HMD 100 may be configured to work in an interconnected fashion with other components within or outside their respective systems. For instance, in an example embodiment, the infrared camera 116 may image one or both of the HMD wearer's eyes. The infrared camera 116 may deliver image information to the processor 112, which may access the memory 114 and make a determination regarding the direction of the HMD wearer's gaze, or gaze direction. The processor 112 may further accept input from the GPS unit 122, the gyroscope 120, and/or the accelerometer 124 to determine the location and orientation of the HMD 100. Subsequently, the processor 112 may control the user interface 115 and the display panel 126 to display virtual images to the HMD wearer that may include context-specific information based on the HMD location and orientation as well as the HMD wearer's gaze direction.

HMD 100 could be configured as, for example, eyeglasses, goggles, a helmet, a hat, a visor, a headband, or in some other form that can be supported on or from the wearer's head. Further, HMD 100 may be configured to display images to both of the wearer's eyes, for example, using two see-through displays. Alternatively, HMD 100 may include only a single see-through display and may display images to only one of the wearer's eyes, either the left eye or the right eye. The HMD 100 may also represent an opaque display configured to display images to one or both of the wearer's eyes without a view of the real-world environment. Further, the HMD 100 could provide an opaque display for a first eye of the wearer as well as provide a view of the real-world environment for a second eye of the wearer.

A power supply 110 may provide power to various HMD components and could represent, for example, a rechargeable lithium-ion battery. Various other power supply materials and types known in the art are possible.

The functioning of the HMD 100 may be controlled by a processor 112 that executes instructions stored in a non-transitory computer readable medium, such as the memory 114. Thus, the processor 112 in combination with instructions stored in the memory 114 may function as a controller of HMD 100. As such, the processor 112 may control the user interface 115 to adjust the images displayed by HMD 100. The processor 112 may also control the wireless communication interface 134 and various other components of the HMD 100. The processor 112 may additionally represent a plurality of computing devices that may serve to control individual components or subsystems of the HMD 100 in a distributed fashion.

In addition to instructions that may be executed by the processor 112, the memory 114 may store data that may include a set of calibrated wearer eye pupil positions and a collection of past eye pupil positions. Thus, the memory 114 may function as a database of information related to gaze direction. Such information may be used by HMD 100 to anticipate where the wearer will look and determine what images are to be displayed to the wearer. Calibrated wearer eye pupil positions may include, for instance, information regarding the extents or range of the wearer's eye pupil movement (right/left and upwards/downwards) as well as wearer eye pupil positions that may relate to various reference axes.

Reference axes could represent, for example, an axis extending from a viewing location and through a target object or the apparent center of a field of view (i.e. a central axis that may project through a center point of the apparent display panel of the HMD). Other possibilities for reference axes exist. Thus, a reference axis may further represent a basis for determining dynamic gaze direction.

In addition, information may be stored in the memory 114 regarding possible control instructions that may be enacted using eye movements. For instance, two consecutive wearer eye blinks may represent a control instruction directing the HMD 100 to capture an image using camera 140. Another possible embodiment may include a configuration such that specific eye movements may represent a control instruction. For example, an HMD wearer may lock or unlock the user interface 115 with a series of predetermined eye movements.

Control instructions could be based on dwell-based selection of a target object. For instance, if a wearer fixates visually upon a particular virtual image or real-world object for longer than a predetermined time period, a control instruction may be generated to select the virtual image or real-world object as a target object. Many other control instructions are possible.

The HMD 100 may include a user interface 115 for providing information to the wearer or receiving input from the wearer. The user interface 115 could be associated with, for example, the displayed virtual images and/or one or more input devices in peripherals 108, such as touchpad 136 or microphone 138. The processor 112 may control the functioning of the HMD 100 based on inputs received through the user interface 115. For example, the processor 112 may utilize user input from the user interface 115 to control how the HMD 100 displays images within a field of view or to determine what images the HMD 100 displays.

An eye-tracking system 102 may be included in the HMD 100. In an example embodiment, an eye-tracking system 102 may deliver information to the processor 112 regarding the eye position of a wearer of the HMD 100. The eye-tracking data could be used, for instance, to determine a direction in which the HMD wearer may be gazing. The processor 112 could determine target objects among the displayed images based on information from the eye-tracking system 102. The processor 112 may control the user interface 115 and the display panel 126 to adjust the target object and/or other displayed images in various ways. For instance, an HMD wearer could interact with a mobile-type menu-driven user interface using eye gaze movements.

The infrared camera 116 may be utilized by the eye-tracking system 102 to capture images of a viewing location associated with the HMD 100. Thus, the infrared camera 116 may image the eye of an HMD wearer that may be located at the viewing location. The images could be either video images or still images. The images obtained by the infrared camera 116 regarding the HMD wearer's eye may help determine where the wearer is looking within the HMD field of view, for instance by allowing the processor 112 to ascertain the location of the HMD wearer's eye pupil. Analysis of the images obtained by the infrared camera 116 could be performed by the processor 112 in conjunction with the memory 114 to determine, for example, a gaze direction.

The imaging of the viewing location could occur continuously or at discrete times depending upon, for instance, HMD wearer interactions with the user interface 115 and/or the state of the infrared light source 118 which may serve to illuminate the viewing location. The infrared camera 116 could be integrated into the optical system 106 or mounted on the HMD 100. Alternatively, the infrared camera could be positioned apart from the HMD 100 altogether. Furthermore, the infrared camera 116 could additionally represent a conventional visible light camera with sensing capabilities in the infrared wavelengths.

The infrared light source 118 could represent one or more infrared light-emitting diodes (LEDs) or infrared laser diodes that may illuminate a viewing location. One or both eyes of a wearer of the HMD 100 may be illuminated by the infrared light source 118. The infrared light source 118 may be positioned along an optical axis common to the infrared camera, and/or the infrared light source 118 may be positioned elsewhere. The infrared light source 118 may illuminate the viewing location continuously or may be turned on at discrete times. Additionally, when illuminated, the infrared light source 118 may be modulated at a particular frequency. Other types of modulation of the infrared light source 118, such as adjusting the intensity level of the infrared light source 118, are possible.

The eye-tracking system 102 could be configured to acquire images of glint reflections from the outer surface of the cornea, which are also called first Purkinje images. Alternatively, the eye-tracking system 102 could be configured to acquire images of reflections from the inner, posterior surface of the lens, which are termed fourth Purkinje images. In yet another embodiment, the eye-tracking system 102 could be configured to acquire images of the eye pupil with so-called bright and/or dark pupil images. In practice, a combination of these glint and pupil imaging techniques may be used for rotational eye tracking, accuracy, and redundancy. Other imaging and tracking methods are possible. Those knowledgeable in the art will understand that there are several alternative ways to achieve eye tracking with a combination of infrared illuminator and camera hardware.

The HMD-tracking system 104 could be configured to provide an HMD position and an HMD orientation to the processor 112. This position and orientation data may help determine a central axis to which a gaze direction is compared. For instance, the central axis may correspond to the orientation of the HMD.

The gyroscope 120 could be a microelectromechanical system (MEMS) gyroscope, a fiber optic gyroscope, or another type of gyroscope known in the art. The gyroscope 120 may be configured to provide orientation information to the processor 112. The GPS unit 122 could be a receiver that obtains clock and other signals from GPS satellites and may be configured to provide real-time location information to the processor 112. The HMD-tracking system 104 could further include an accelerometer 124 configured to provide motion input data to the processor 112.

The optical system 106 could include components configured to provide virtual images at an internal viewing location. The internal viewing location may correspond to the location of one or both eyes of a wearer of an HMD 100. The components could include a display panel 126, a display light source 128, optics 130, and an optical element 132. These components may be optically and/or electrically-coupled to one another and may be configured to provide viewable images at an internal viewing location and/or at an externally-projected location. As mentioned above, one or two optical systems 106 could be provided in an HMD apparatus. In other words, the HMD wearer could view virtual images in one or both eyes, as provided by one or more optical systems 106. Also, as described above, the optical system(s) 106 could include an opaque display and/or a see-through display, which may allow a view of the real-world environment while providing superimposed virtual images.

As in an aforementioned example embodiment, optical element 132 could represent various optical components known in the art configured, for instance, to redirect or otherwise interact with a light beam. For instance, the optical element 132 could be a plane mirror, a focusing mirror, a beam splitter, a wave plate, a polarizer, a lens and other optical components and combinations thereof known in the art.

In particular, the optical element 132 could have at least a first configuration and a second configuration. Further, the optical element 132 could be adjusted between the first and the second configurations in order to externally project images from the HMD or make the images viewable at an internal viewing location. The first and the second configurations of the optical element could be related to various properties of the optical element including one of or a combination of polarization, reflectance, opacity, and/or refractive index. Other components of HMD 100, for instance the processor 112, could control the configuration of optical element 132, for instance through electrical signals or other known means, such that images generated by display panel 126 could be externally projected from the HMD 100 and/or viewable at an internal viewing location, which may correspond with the HMD wearer's eye(s).

Various peripheral devices 108 may be included in the HMD 100 and may serve to provide information to and from a wearer of the HMD 100. In one example, the HMD 100 may include a wireless communication interface 134 for wirelessly communicating with one or more devices directly or via a communication network. For example, wireless communication interface 134 could use 3G cellular communication, such as CDMA, EVDO, GSM/GPRS, or 4G cellular communication, such as WiMAX or LTE. Alternatively, wireless communication interface 134 could communicate with a wireless local area network (WLAN), for example, using WiFi. In some embodiments, wireless communication interface 134 could communicate directly with a device, for example, using an infrared link, Bluetooth, or ZigBee. The wireless communication interface 134 could interact with devices that may include, for example, components of the HMD 100 and/or externally-located devices.

Although FIG. 1 shows various components of the HMD 100 (i.e., wireless communication interface 134, processor 112, memory 114, infrared camera 116, display panel 126, GPS 122, and user interface 115) as being integrated into HMD 100, one or more of these components could be physically separate from HMD 100. For example, the optical system 106 could be mounted on the wearer separate from HMD 100. Thus, the HMD 100 could be part of a wearable computing device in the form of separate devices that can be worn on or carried by the wearer. The separate components that make up the wearable computing device could be communicatively coupled together in either a wired or wireless fashion.

Figure 2A:
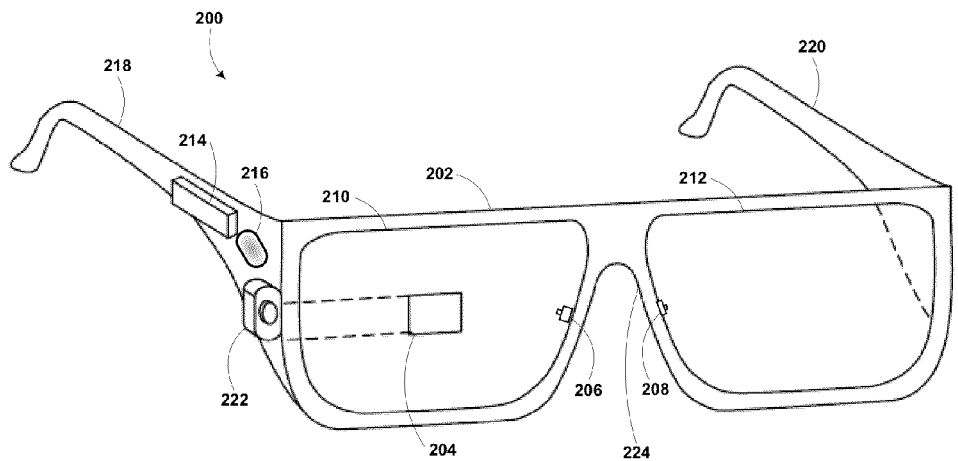
FIG. 2A is a perspective view of a head-mounted display, in accordance with an example embodiment.
Figure 2B:
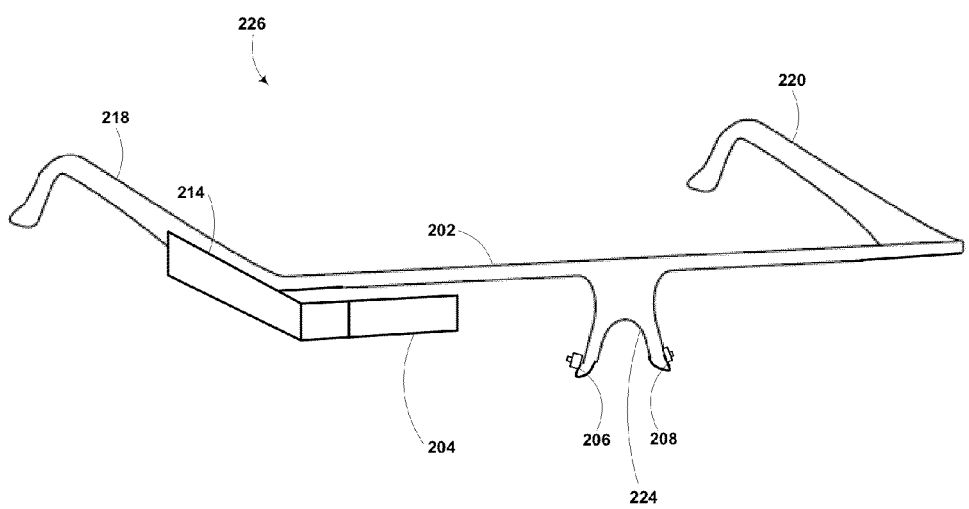
FIG. 2B is a perspective view of a head-mounted display, in accordance with an example embodiment.
Figure 2C:
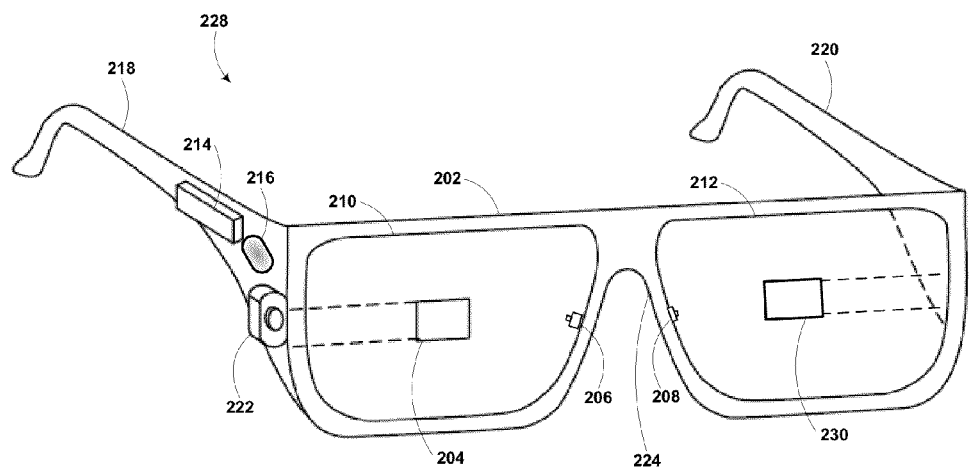
FIG. 2C is a perspective view of a head-mounted display, in accordance with an example embodiment.

FIGS. 2A, 2B, and 2C illustrate example head-mounted displays that have an eyeglasses format. As illustrated in FIG. 2A, the HMD 200 has a frame 202 that could include nosepiece 224 and earpieces 218 and 220. The frame 202, nosepiece 224, and earpieces 218 and 220 could be configured to secure the HMD 200 to a wearer's face via a wearer's nose and ears. Each of the frame elements, 202, 224, and 218 may be formed of a solid structure of plastic and/or metal, or may be formed of a hollow structure of similar material so as to allow wiring and component interconnects to be internally routed through the HMD 200. Other materials may be possible as well.

The earpieces 218 and 220 could be attached to projections that extend away from the lens frame 202 and could be positioned behind a wearer's ears to secure the HMD 200 to the wearer. The projections could further secure the HMD 200 to the wearer by extending around a rear portion of the wearer's head. Additionally or alternatively, for example, the HMD 200 could connect to or be affixed within a head-mounted helmet structure. Other possibilities exist as well.

Lens elements 210 and 212 could be mounted in frame 202. The lens elements 210 and 212 could be formed of any material that can suitably display a projected image or graphic. Each of the lens elements 210 and 212 could be sufficiently transparent to allow a wearer to see through the lens element. Combining these two features of the lens elements may facilitate an augmented reality or a heads-up display where the projected image or graphic is superimposed over a real-world view as perceived by the wearer through lens elements 210 and 212.

The HMD 200 may include a computer 214, a touch pad 216, a camera 222, and a display 204. The computer 214 is shown to be positioned on the extending side arm of the HMD 200; however, the computer 214 may be provided on other parts of the HMD 200 or may be positioned remote from the HMD 200 (e.g., the computer 214 could be wire- or wirelessly-connected to the HMD 200). The computer 214 could include a processor and memory, for example. The computer 214 may be configured to receive and analyze data from the camera 222 and the touch pad 216 (and possibly from other sensory devices, user-interfaces, or both) and generate images for output by the lens elements 210 and 212.

A camera 222 could be positioned on an extending side arm of the HMD 200, however, the camera 222 may be provided on other parts of the HMD 200. The camera 222 may be configured to capture images at various resolutions or at different frame rates. The camera 222 could be configured as a video camera and/or as a still camera. A camera with small form factor, such as those used in cell phones or webcams, for example, may be incorporated into an example embodiment of HMD 200.

Further, although FIG. 2A illustrates one camera 222, more cameras could be used, and each may be configured to capture the same view, or to capture different views. For example camera 222 may be forward facing to capture at least a portion of the real-world view perceived by the wearer. This forward facing image captured by the camera 222 may then be used to generate an augmented reality where computer generated images appear to interact with the real world view perceived by the wearer.

Other sensors could be incorporated into HMD 200. Other sensors may include one or more of a gyroscope or an accelerometer, for example. Other sensing devices may be included in HMD 200.

The touch pad 216 is shown on an extending side arm of the HMD 200. However, the touch pad 216 may be positioned on other parts of the HMD 200. Also, more than one touch pad may be present on the HMD 200. The touch pad 216 may be used by a HMD wearer to input commands. The touch pad 216 may sense at least one of a position and a movement of a finger via capacitive sensing, resistance sensing, or a surface acoustic wave process, among other possibilities. The touch pad 216 may be capable of sensing finger movement in a direction parallel or planar to the pad surface, in a direction normal to the pad surface, or both, and may also be capable of sensing a level of pressure applied to the pad surface. The touch pad 216 may be formed of one or more translucent or transparent insulating layers and one or more translucent or transparent conducting layers. Edges of the touch pad 216 may be formed to have a raised, indented, or roughened surface, so as to provide tactile feedback to an HMD wearer when the wearer's finger reaches the edge, or other area, of the touch pad 216. If more than one touch pad is present, each touch pad may be operated independently, and may provide a different function.

Additionally, the HMD 200 may include eye-tracking systems 206 and 208, which may be configured to track the eye position of each eye of the HMD wearer. The eye-tracking systems 206 and 208 may each include one or more infrared light sources and one or more infrared cameras. Each of the eye-tracking systems 206 and 208 could be configured to image one or both of the HMD wearer's eyes. Although two eye-tracking systems are depicted in FIG. 2A, other embodiments are possible. For instance, one eye-tracking system could be used to track both eyes of a HMD wearer.

Display 204 could represent, for instance, an at least partially reflective surface upon which images could be projected using a projector. The lens elements 210 and 212 could act as a combiner in a light projection system and may include a coating that reflects the light projected onto them from projectors. In some embodiments, a reflective coating may be omitted (e.g., when the projectors are scanning laser devices). The images could be thus viewable to an HMD wearer.

Although the display 204 is depicted as presented to the right eye of the HMD wearer, other example embodiments could include a display for both eyes or a single display viewable by both eyes.

In alternative embodiments, other types of display elements may be used. For example, the lens elements 210 and 212 could themselves include: a transparent or semi-transparent matrix display, such as an electroluminescent display or a liquid crystal display, one or more waveguides for delivering an image to the HMD wearer's eyes, or other optical elements capable of delivering an in focus near-to-eye image to the wearer. A corresponding display driver may be disposed within the frame 202 for driving such a matrix display. Alternatively or additionally, a laser or light-emitting diode (LED) source and scanning system could be used to draw a raster display directly onto the retina of one or more of the wearer's eyes. Other possibilities exist as well.

In FIG. 2B, an HMD 226 with a monocle design is illustrated. The HMD frame 202 could include nosepiece 224 and earpieces 218 and 220. The HMD 226 may include a single display 204 that may be coupled to one of the side arms or the nose piece 224. In one example, the single display 204 could be coupled to the inner side (i.e. the side exposed to a portion of a HMD wearer's head when worn by the wearer) of the extending side arm of frame 202. The display 204 could be positioned in front of or proximate to a wearer's eye when the HMD 200 is worn by a wearer. The display 204 could be configured to overlay computer-generated graphics upon the wearer's view of the physical world.

As in the aforementioned embodiments, eye-tracking systems 206 and 208 could be mounted on nosepiece 224. The eye-tracking systems 206 and 208 could be configured to track the eye position of both eyes of an HMD wearer. The HMD 226 could include a computer 214 and a display 204 for one eye of the wearer.

FIG. 2C illustrates an HMD 228 with a binocular design. In such an embodiment, separate displays could be provided for each eye of an HMD wearer. For example, displays 204 and 230 could be provided to the right and left eye of the HMD wearer, respectively. Alternatively, a single display could provide images to both eyes of the HMD wearer. The images provided to each eye may be different or identical to one another. Further, the images could be provided to each eye in an effort to create a stereoscopic illusion of depth.

Figure 3A:
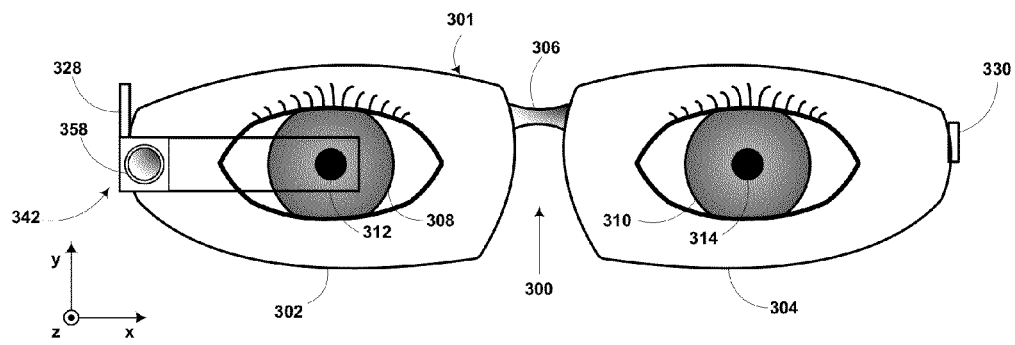
FIG. 3A is a front view of a head-mounted display, in accordance with an example embodiment.

FIG. 3A illustrates a front view of an HMD 300 with an optical system 342. The HMD could be in the form of glasses with glasses frame 301 that could include a nose piece 306 and side arms 328 and 330. Lens elements 302 and 304 could be see-through and could be oriented in front of the HMD wearer's eyes (308 and 310). In an example embodiment, the optical system 342 could be attached to a side arm 328 and be mounted in front of the HMD wearer's eye 308. The optical system 342 could include external projection optics 358 that could be configured to project light to an external location.

Figure 3B:
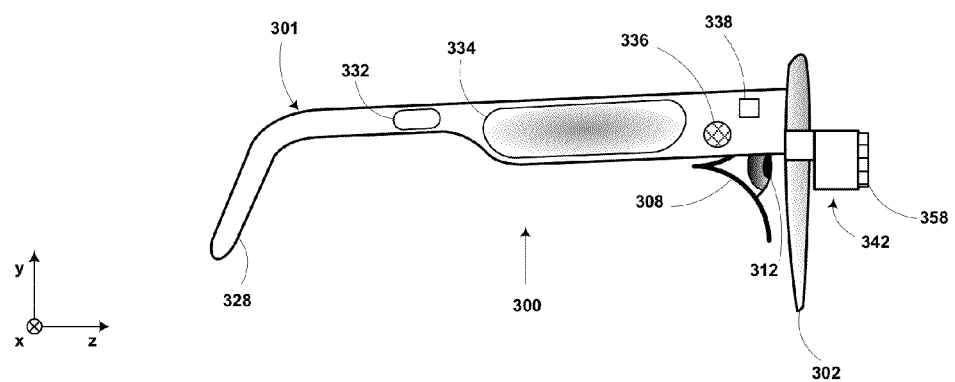
FIG. 3B is a side view of a head-mounted display of FIG. 3A, in accordance with an example embodiment.

FIG. 3B shows a right side view of the HMD 300 of FIG. 3A. The side arm 328 could include several elements including a computer 332, a touchpad 334, a microphone 336, and a button 338. Other elements are possible.

Figure 3C:
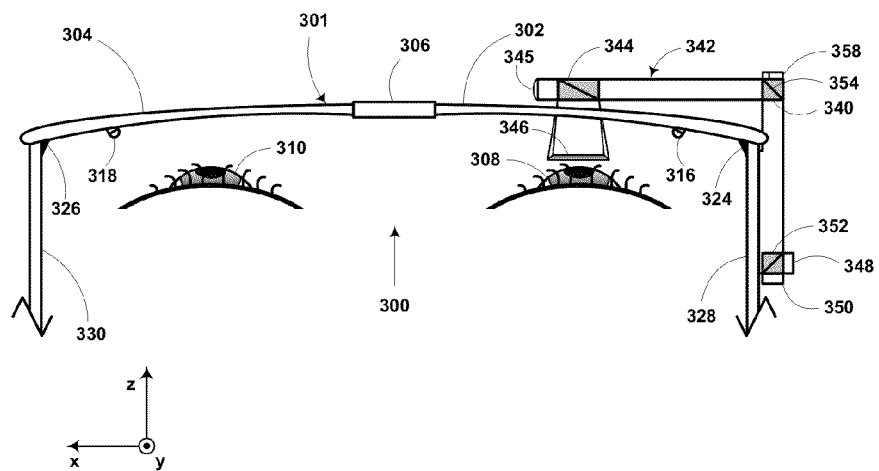
FIG. 3C is a top view of a head-mounted display with an optical element in a first configuration, in accordance with an example embodiment.
Figure 3D:
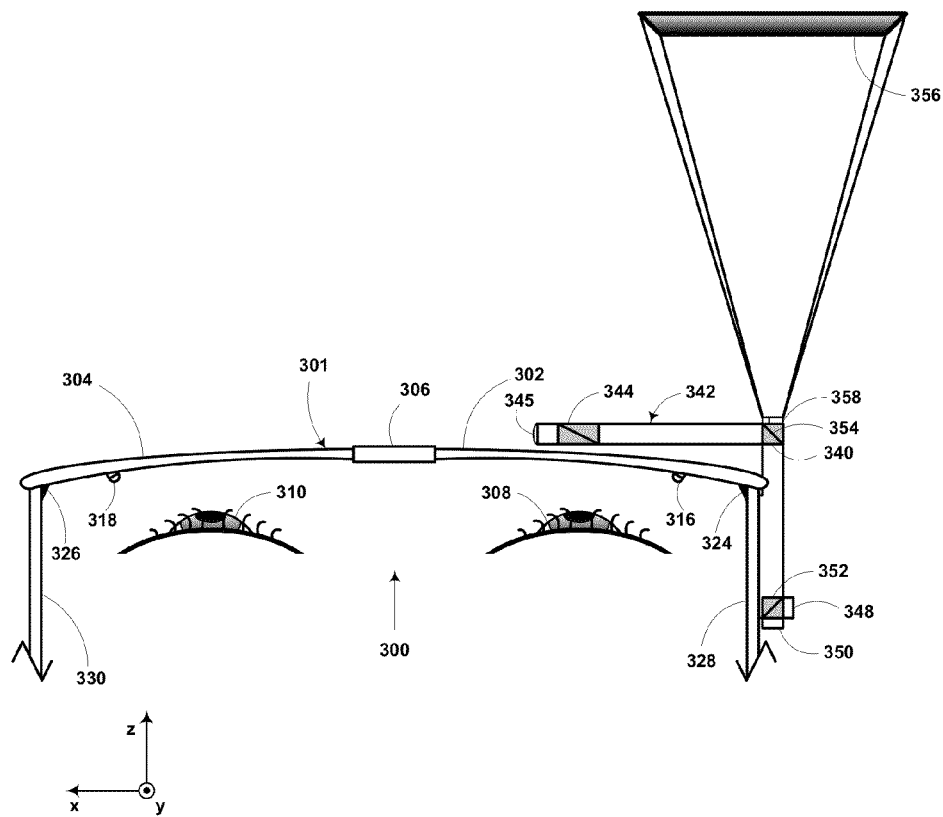
FIG. 3D is a top view of the head-mounted display of FIG. 3C with an optical element in a second configuration, in accordance with an example embodiment.

FIGS. 3C and 3D illustrate a top view of an HMD with an optical system and an optical element in a first configuration and a second configuration, respectively. As in FIGS. 3A and 3B, the optical system 342 could be attached onto or integrated into HMD 300. The optical system 342 could include a display light source 348, a display panel 350, a display beam splitter 352, a proximal beam splitter 344, and an image former 345. The optical system 342 may include a set of external projection optics 358 that could include a focusing lens, zoom lens, and other optical components for projection known in the art. In one embodiment, the optical element could be represented by distal beam splitter 340. Further, although one optical system 342 is shown in FIGS. 3A, 3B, 3C, and 3D, in some embodiments, optical systems 342 could be provided to both eyes of an HMD wearer. Those with skill in the art will understand there are many other configurations possible in such an optical system and those configurations are implicitly contemplated herein.

Distal beam splitter 340 may include a distal beam splitting interface 354 that could have properties that are configurable. In other words, the distal beam splitting interface 354 may include a material with one or more configurations. In one example embodiment, the optical element could be configured to be in a first or a second configuration. For instance, the optical element could have an adjustable reflectance. The material of the distal beam splitter 354 could have electrooptic properties such that the reflectance of the beam splitting coating could be modified with an electrical signal. Thus, HMD computer 332 could be instructed to control the configuration of the optical element/distal beam splitter 340 in an effort to control the reflectance of the distal beam splitting interface 354 using, for example, electrical signals.

The display panel 350 could be configured to generate a light pattern from which the virtual and/or real images could be formed. The display panel 350 could be an emissive display, such as an organic light-emitting diode (OLED) display. Alternatively, the display panel 350 may be a liquid-crystal on silicon (LCOS) or a micro-mirror display such as a digital light projector (DLP) that generates the light pattern by spatially modulating light from the display light source 348. The display light source 348 may include, for example, one or more light-emitting diodes (LEDs) and/or laser diodes. The light pattern generated by the display panel 350 could be monochromatic, or it could include multiple colors (such as red, green, and blue) to provide a color gamut for the virtual and/or real images.

In the example embodiment, the distal beam splitter 340 could be adjusted to substantially reflect light from display panel 350 towards the proximal beam splitter 344 and image former 345. Image former 345 may include a concave mirror or other optical component that forms a virtual image that is viewable through proximal beam splitter 344. In this way, an internally viewable image 346 could be delivered to the HMD wearer's eye 308. Alternatively, the distal beam splitter 340 could be adjusted to substantially transmit light externally away from the HMD to generate an externally projected image 356. Further, by adjusting the configuration of the distal beam splitter 340, the relative brightness between the internal viewable image 346 and the externally projected image 356 may be controlled. Other proportions, such as polarization content of the internally viewable image 346 and the externally projected image 356 could be controlled.

The displayed images (either or both of the internally viewable image 346 and the externally projected image 356) may be adjusted based on information acquired from the HMD-tracking system 104 and the eye-tracking system 106. For instance, the externally projected images may be stabilized and/or adjusted based on at least data from the HMD-tracking system 104 to minimize the effect of wearer head movements. Additionally, eye-movements could be imaged with the eye-tracking system 106 and used, for instance, to determine target objects from among the externally projected images. Other interactions between the displayed images, HMD-tracking system, and eye-tracking system are possible.

Other optical components may be included in the optical system 342, such as external projection optics 358 that could be optically coupled to distal beam splitter 340. Further, other possibilities for systems that provide a dual-purpose projector/near-eye display may be implemented within the context of this invention. Those skilled in the art will understand that other user input devices, user output devices, wireless communication devices, sensors, and cameras may be reasonably included in such a wearable computing system.

Within the context of the invention, there may be several ways to utilize an optical element to change the viewability of images generated by an HMD. The viewability of images could be adjusted for external viewing (e.g., in an external projection situation) and/or for viewing at an internal viewing location (e.g., when images are viewable to only the HMD wearer).

In other embodiments, adjusting the optical element between a first and a second configuration could change one or more properties of the optical element. For instance, light transmission through the optical element could be modified by adjusting the optical element between a first and a second configuration.

In one such embodiment, the optical element could be a linear polarizer and the input polarization of light could be varied. As the transmission of light through the optical element may change with different input polarizations, the light transmitted through the optical element could be changed without any direct adjustment to the optical element itself. Further, the linear polarizer could be rotated physically between two angles (which may represent the first and the second configurations of the optical element) in order to adjust the transmitted light through the optical element.

Figure 3E:
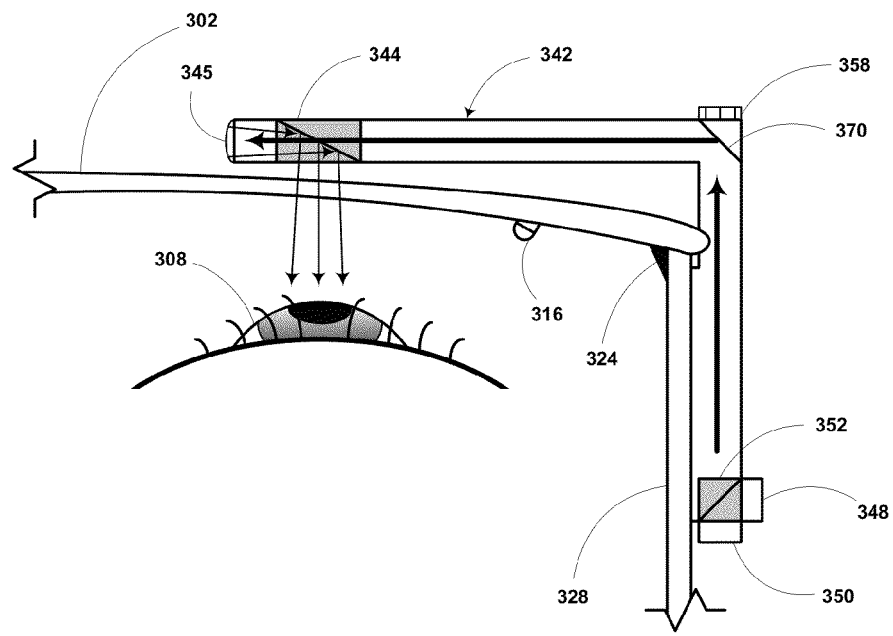
FIG. 3E is a top view of a head-mounted display with a movable mirror in a first configuration, in accordance with an example embodiment.
Figure 3F:
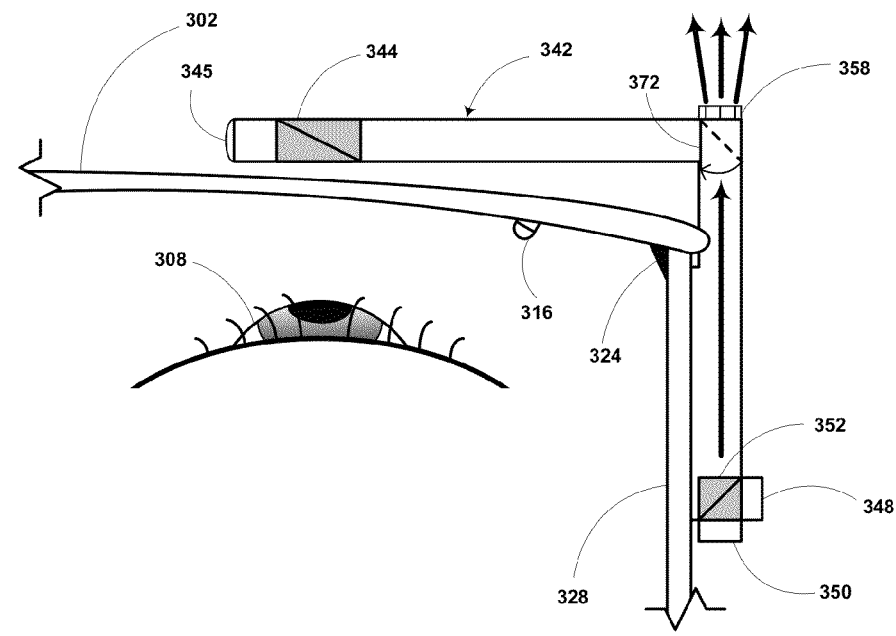
FIG. 3F is a top view of the head-mounted display of FIG. 3E with a movable mirror in a second configuration, in accordance with an example embodiment.

FIGS. 3E and 3F illustrate an optical system and a mirror in a first and a second configuration respectively. In the example embodiment, the optical element could include a movable mirror 370. The movable mirror element could represent a mirror at a first angle with respect to the display panel. In this example embodiment, the mirror 370 at a first angle could represent a first configuration of the optical element. Thus, images generated by display panel 350 could be reflected off the movable mirror 370 and be transmitted towards the proximal beam splitter 344 and image former 345. After interaction with these elements, an image could be viewed at an internal location, which may correspond to an HMD wearer's eye 308.

In order to change between the first configuration and the second configuration of the optical element, which could adjust a reflected light angle from the optical element, the movable mirror 370 could be adjusted from the first angle to a second angle with respect to the display panel. In other embodiments, the movable mirror 370 may move such that the angle does not change with respect to the display, but rather the movable mirror may move substantially orthogonally with respect to the display panel and may occlude or unblock various optics that could represent output or projection optics. Depending upon the embodiment, a field of view of the real-world environment could remain viewable from the internal viewing location while the optical element is in the first configuration as well as while the optical element is in the second configuration.

Upon adjusting the movable mirror 370 to a rotated mirror position 372, images generated by the display panel 350 may pass through to the external projection optics 358 and images may be projected to an external viewing location 356.

In another example embodiment, a liquid crystal lens could be utilized as the optical element. For instance, using an electrical field, the refractive index of the element can be adjusted dynamically. As such, the transmission intensity and output light wave can be modified depending upon at least the refractive index of various portions of the optical element. Accordingly, light (e.g., the images generated by the display panel) could be steered, focused, or otherwise modified by adjusting various characteristics of the optical system, such as light transmission and reflectance of the optical element.

Furthermore, several optical devices known in the art could be used together in the optical element within the context of this invention. For instance, a mirror, a rotatable polarizer, and a waveplate could be used together in order to control the reflectance of the assembly, which could be considered the optical element. Other examples of optical elements are possible.

Figure 4:
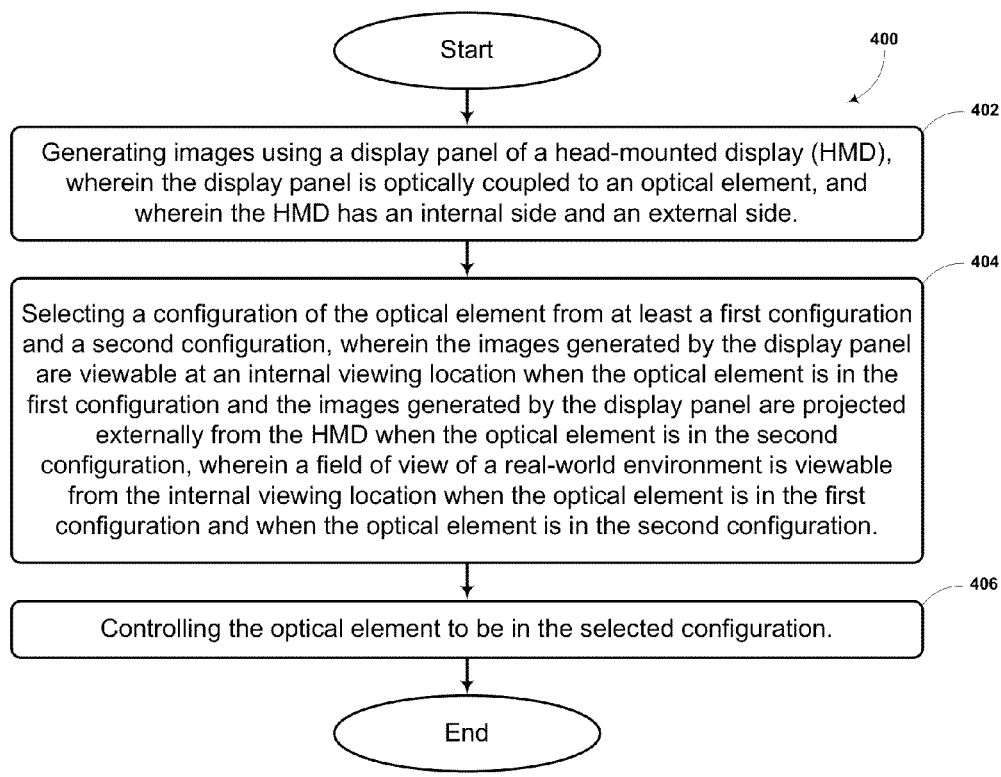
FIG. 4 is a flowchart of a method, in accordance with an example embodiment.

3. A Method for Displaying Images with a Dual-Purpose Projector/Near-Eye Display A method 400 is provided for displaying images with a dual-purpose projector/near-eye display. The method could be performed using any of the apparatus shown in FIGS. 1-3F and described above, however, other configurations could be used. FIG. 4 illustrates the steps in an example method, however, it is understood that in other embodiments, the steps may appear in different order and steps could be added or subtracted.

Step 402 includes generating images using a display panel of a head-mounted display (HMD). The display panel is optically coupled to an optical element. The HMD could be HMD 300 or could be another type of head mounted display known in the art. As described above, the displayed images include, but should be not limited to, graphics that represent text, pictures, icons, menus and other objects common to graphical user interfaces known in the art. Other possibilities for displayed images exist.

Step 404 includes selecting a configuration of the optical element from at least a first configuration and a second configuration. The images generated by the display panel could be viewable at an internal viewing location (e.g., the HMD wearer's eye(s)) when the optical element is in the first configuration, for instance as shown in FIG. 3C. The images generated by the display panel could further be projected externally from the HMD when the optical element is in the second configuration, for instance as shown in FIG. 3D. A field of view of the real-world environment could remain viewable from the internal viewing location regardless of whether the optical element is in the first configuration or the second configuration. The first and the second configurations could be based upon changing a property or properties of the optical element. For instance, the optical element could include an adjustable refractive index, based upon the configuration of the optical element. In the example embodiment, a beam splitter representing the optical element could have a beam-splitting coating that may include a material with electrooptic properties. The electrooptic material may have a refractive index property that could be controlled with electrical signals. Thus, the HMD could control the refractive index of the optical element by controlling the electrooptic material using electrical signals.

Other properties of the optical element that could be changed when switching between a first and a second configuration of the optical element could be, but are not limited to, reflectance, opacity and polarization.

The selection of a particular configuration of the optical element could occur, for instance, upon input to the HMD or based on the context of the HMD environment. In one embodiment, the HMD wearer could provide the input to the HMD to select at least a first or a second configuration of the optical element. For example, if the HMD wearer would like to project images externally from the HMD, he/she may select the second configuration from a software menu with the HMD touchpad or speak a voice command. Other input means are possible. Alternatively, the configuration could be selected automatically via software or remotely via a network server, for example.

It will be evident to those skilled in the art that other configurations of the optical element are possible. For instance, first and second configurations of the optical element that permit contrasting properties (e.g., transmissive/opaque, reflected/transmissive, high refractive index/low refractive index) in the optical element could be selected and used to direct the image towards an internal and/or an external viewing location.

Step 406 includes controlling the optical element to be in the selected configuration. For instance, in one example embodiment, when the optical element is selected to be in the first configuration, the displayed images could be viewable at an internal viewing location, such as an eye or eyes of the HMD wearer, for instance as shown in FIG. 3C. For example, a moveable mirror could be controlled to be in a first or a second configuration. When the mirror is in the first configuration, the mirror may be highly reflective and images generated by the display panel could be transmitted towards a proximal beam splitter, image former and thereafter towards the internal viewing location. The internal viewing location could correspond with an HMD wearer's eye or eyes.

When the optical element is controlled to be in the second configuration, the images generated by the display panel could be viewable as externally projected images, for example as shown in FIG. 3D. Using the aforementioned example embodiment with the controllable mirror, when the optical element is in the second configuration, the reflectance of the mirror may be minimized. Thus, the mirror could be in a configuration such that light passes through it towards an exit aperture of the HMD. Thereafter, the images generated by the display panel could be externally projected from the HMD.

Further, the configuration of the optical element could be controlled to allow a mixing of the two sets of generated images to the different viewing (internal/external) locations. For instance, the optical element could support a mixed configuration in which images are displayed at both the internal viewing location and the externally-projected location. In addition, by 'tuning' the configuration of the optical element, various aspects of the two sets of displayed images can be controlled, such as the relative brightness between the images displayed at the internal viewing location and the images projected to an external location. Such mixtures could include an internal portion of images that are viewable at the internal viewing location as well as an external portion of images that are projected an external location. The computer could be operable to control the relative brightness or relative portions of images within the mixture. Other ways to mix the two sets of generated images are possible within the context of the disclosure.

Depending on the embodiment, the externally projected images could be different from those images viewable at the internal viewing location. For example, the optical element could include a switchable polarizer operable at 30 Hz or above. In such an example, the display could be configured to alternate between two different images or two different image streams in synchronicity with the polarizer. Accordingly, if the optical element includes a polarizing beam splitter and the different images/image streams are routed appropriately, the externally projected image may be different from those images viewable at the internal viewing location.

In another example embodiment, the optical element could include two separate light paths. The first light path could direct light towards the internal viewing location and the second light path could direct light so as to be externally projected. A digital light panel (DLP) mirror array could be configured to alternate between the two separate light paths fast enough to externally project a first image or image stream while displaying a different image or image stream at the internal viewing location.

Example methods, such as method 400 of FIG. 4, may be carried out in whole or in part by the wearable computer having a head-mountable display (HMD). Accordingly, example methods could be described by way of example herein as being implemented by the HMD. However, it should be understood that an example method may be implemented in whole or in part by other computing devices. For example, an example method may be implemented in whole or in part by a server system, which receives data from a device such as an HMD. As additional examples, an example method may be implemented in whole or in part by computing devices such as a mobile phone, a tablet computer, and/or a laptop or desktop computer. Other examples of computing devices or combinations of computing devices that can implement an example method are possible.

Those skilled in the art will understand that there are other similar methods that could describe controlling an optical element of an HMD to adjustably provide displayed images at either an internal viewing location or an externally-projected location, or at both locations with adjustable amounts of viewability. Those similar methods are implicitly contemplated herein.

4. A Non-Transitory Computer Readable Medium for Displaying Images with a Dual-Purpose Projector/Near-Eye Display Some or all of the functions described above and illustrated in FIGS. 3A, 3B, 3C, 3D, 3E, 3F, and 4 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a wearable computing device, such as a wearable computing device 100 illustrated in FIG. 1. Alternatively, the computing device that executes the stored instructions could be another computing device, such as a server in a server network.

The non-transitory computer readable medium may store instructions executable by the processor 112 to perform various functions. For instance, the processor 112 could be instructed to control a display panel of a head-mounted display (HMD) to generate images. The display panel could be optically coupled to an optical element.

The non-transitory computer readable medium may further include instructions executable by the processor 112 to carry out functions such as controlling a configuration of the optical element between at least a first configuration and a second configuration. Furthermore, the displayed images could be viewable at a viewing location, which may correspond to one or both eyes of an HMD wearer, when the optical element is in the first configuration and the displayed images may be projected externally from the HMD when the optical element is in the second configuration.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A wearable computing device, comprising:
   a head-mounted display (HMD) having an internal side and an external side, wherein the HMD comprises a display panel configured to generate images;
   an optical element, wherein the optical element is optically coupled to the display panel and is adjustable between a first configuration and a second configuration, wherein the images generated by the display panel are viewable at an internal viewing location when the optical element is in the first configuration and the images generated by the display panel are projected externally from the HMD when the optical element is in the second configuration, wherein a field of view of a real-world environment is viewable from the internal viewing location when the optical element is in the first configuration and when the optical element is in the second configuration; and
   a computer, wherein the computer is configured to adjust the optical element between the first configuration and the second configuration.

2. The wearable computing device of claim 1, wherein the optical element supports a mixed configuration in which the images generated by the display panel are viewable at the internal viewing location and are also projected externally from the HMD.

3. The wearable computing device of claim 1, wherein the display panel comprises an organic light-emitting diode (OLED) display panel.

4. The wearable computing device of claim 1, wherein the display panel comprises a liquid crystal on silicon (LCOS) display panel.

5. The wearable computing device of claim 1, wherein the optical element comprises a movable mirror.

6. The wearable computing device of claim 1, wherein the optical element comprises a beamsplitter.

7. The wearable computing device of claim 6, wherein the beamsplitter comprises a polarizing beamsplitter.

8. The wearable computing device of claim 1, wherein the optical element comprises a liquid crystal lens.

9. The wearable computing device of claim 1, wherein the optical element comprises a liquid crystal beam splitter.

10. The wearable computing device of claim 1, wherein adjusting the optical element between the first configuration and the second configuration comprises changing a refractive index of at least a portion of the optical element.

11. The wearable computing device of claim 10, wherein the optical element comprises an electrooptic material.

12. The wearable computing device of claim 1, wherein the optical element is substantially reflecting when the optical element is in the first configuration and wherein the optical element is substantially transparent when the optical element is in the second configuration.

13. The wearable computing device of claim 1, wherein the optical element is substantially opaque when the optical element is in the first configuration and wherein the optical element is substantially transparent when the optical element is in the second configuration.

14. The wearable computing device of claim 1, wherein the optical element selects a first polarization when the optical element is in the first configuration and wherein the optical element selects a second polarization when the optical element is in the second configuration, and wherein the first and second polarizations are substantially orthogonal.

15. A method, comprising:
    generating images using a display panel of a head-mounted display (HMD), wherein the display panel is optically coupled to an optical element, wherein the optical element is adjustable between a first configuration and a second configuration, and wherein the HMD has an internal side and an external side;
    selecting a configuration of the optical element from among at least the first configuration and the second configuration, wherein the images generated by the display panel are viewable at an internal viewing location when the optical element is in the first configuration and the images generated by the display panel are projected externally from the HMD when the optical element is in the second configuration, wherein a field of view of a real-world environment is viewable from the internal viewing location when the optical element is in the first configuration and when the optical element is in the second configuration; and
    controlling, by a computer, the optical element to be in the selected configuration.

16. The method of claim 15, wherein the selected configuration is a mixed configuration in which the images generated by the display panel are viewable at the internal viewing location and are also projected externally from the HMD.

17. The method of claim 15, wherein the optical element comprises a movable mirror.

18. The method of claim 15, wherein the optical element comprises a beamsplitter.

19. The method of claim 18, wherein the beamsplitter comprises a polarizing beamsplitter.

20. The method of claim 15, wherein the optical element comprises a liquid crystal lens.

21. The method of claim 15, wherein the optical element comprises a liquid crystal beam splitter.

22. The method of claim 15, wherein the optical element has a first refractive index in the first configuration and the optical element has a second refractive index in the second configuration, and wherein the first refractive index and the second refractive index are not equal.

23. The method of claim 22, wherein the optical element comprises an electrooptic material.

24. The method of claim 15, wherein the optical element is substantially reflecting when the optical element is in the first configuration and wherein the optical element is substantially transparent when the optical element is in the second configuration.

25. The method of claim 15, wherein the optical element is substantially opaque when the optical element is in the first configuration and wherein the optical element is substantially transparent when the optical element is in the second configuration.

26. The method of claim 15, wherein the optical element selects a first polarization when the optical element is in the first configuration and wherein the optical element selects a second polarization when the optical element is in the second configuration, and wherein the first and second polarizations are substantially orthogonal.

27. A non-transitory computer readable medium having stored therein instructions executable by a computing device to cause the computing device to perform functions, the functions comprising:
    controlling a display panel of a head-mounted display (HMD) to generate images, wherein the display panel is optically coupled to an optical element, wherein the optical element is adjustable between a first configuration and a second configuration, and wherein the HMD has an internal side and an external side;

selecting a configuration of the optical element from among at least the first configuration and the second configuration, wherein the images generated by the display panel are viewable at an internal viewing location when the optical element is in the first configuration and wherein the images generated by the display panel are projected externally from the HMD when the optical element is in the second configuration, wherein a field of view of a real-world environment is viewable from the internal viewing location when the optical element is in the first configuration and when the optical element is in the second configuration; and controlling the optical element to be in the selected configuration.

28. The non-transitory computer readable medium of claim 27, wherein the optical element has a first refractive index in the first configuration and the optical element has a second refractive index in the second configuration and wherein the first refractive index and the second refractive index are not equal.

29. The non-transitory computer readable medium of claim 28, wherein the optical element comprises an electrooptic material.

30. The non-transitory computer readable medium of claim 27, wherein the optical element is substantially reflecting when the optical element is in the first configuration and wherein the optical element is substantially transparent when the optical element is in the second configuration.

31. The non-transitory computer readable medium of claim 27, wherein the optical element is substantially opaque when the optical element is in the first configuration and wherein the optical element is substantially transparent when the optical element is in the second configuration.

32. The non-transitory computer readable medium of claim 27, wherein the optical element selects a first polarization when the optical element is in the first configuration and wherein the optical element selects a second polarization when the optical element is in the second configuration, and wherein the first and second polarizations are substantially orthogonal.

* * * * *